(12) United States Patent
Nayak et al.

(10) Patent No.: US 11,617,024 B2
(45) Date of Patent: Mar. 28, 2023

(54) DUAL CAMERA REGIONS OF INTEREST DISPLAY

(71) Applicant: Hewlett-Packard Development Company, L.P., Spring, TX (US)

(72) Inventors: Vijaykumar Nayak, San Diego, CA (US); Yun David Tang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/262,266

(22) PCT Filed: Nov. 12, 2018

(86) PCT No.: PCT/US2018/060277
§ 371 (c)(1),
(2) Date: Jan. 22, 2021

(87) PCT Pub. No.: WO2020/101636
PCT Pub. Date: May 22, 2020

(65) Prior Publication Data
US 2021/0266458 A1 Aug. 26, 2021

(51) Int. Cl.
*H04N 23/951* (2023.01)
*H04N 5/33* (2023.01)
*H04N 23/67* (2023.01)
*H04N 23/69* (2023.01)

(52) U.S. Cl.
CPC ............. *H04N 23/951* (2023.01); *H04N 5/33* (2013.01); *H04N 23/67* (2023.01); *H04N 23/69* (2023.01)

(58) Field of Classification Search
CPC .......... H04N 5/23232; H04N 5/23212; H04N 5/23296; H04N 5/33; H04N 5/225
See application file for complete search history.

(56) References Cited

U.S. PATENT DOCUMENTS

| | | | |
|---|---|---|---|
| 6,714,665 B1 | 3/2004 | Hanna et al. | |
| 6,972,787 B1* | 12/2005 | Allen | H04N 7/181 |
| | | | 348/162 |
| 7,734,119 B2 | 6/2010 | Cheryauka et al. | |
| 8,416,236 B1 | 4/2013 | Hickman et al. | |
| 10,064,552 B1* | 9/2018 | Vaziri | H04N 5/76 |
| 10,194,080 B2* | 1/2019 | Rozploch | H04N 5/332 |
| 11,044,418 B2* | 6/2021 | Chang | H04N 5/247 |
| 2003/0093805 A1* | 5/2003 | Gin | H04N 5/33 |
| | | | 348/143 |
| 2006/0187322 A1 | 8/2006 | Janson, Jr. et al. | |
| 2014/0055632 A1 | 2/2014 | Lelescu et al. | |
| 2015/0097911 A1 | 4/2015 | Ono | |
| 2015/0097981 A1* | 4/2015 | Griffith | H04N 5/2628 |
| | | | 348/218.1 |

(Continued)

*Primary Examiner* — Gevell V Selby
(74) *Attorney, Agent, or Firm* — Quarles & Brady LLP (57) ABSTRACT

A method of determining a region of interest may include with a first image capturing device, determining a region of interest within a field of view common between the first image capturing device and a second image capturing device, the first image capturing device capturing an image at a lower resolution than the second image capturing device; determining a corner defining the region of interest; and upscaling the determined corner to match a corner within a field of view of an image captured by the second image capturing device.

20 Claims, 4 Drawing Sheets

(56) References Cited

U.S. PATENT DOCUMENTS

| | | |
|---|---|---|
| 2017/0150061 A1 | 5/2017 | Shabtay et al. |
| 2017/0223338 A1 | 8/2017 | Kang et al. |
| 2017/0366795 A1* | 12/2017 | Chou .................. H04N 13/398 |
| 2018/0267176 A1* | 9/2018 | Takahashi ............. A61B 6/4266 |
| 2019/0082101 A1* | 3/2019 | Baldwin .............. H04N 5/2258 |
| 2019/0121216 A1* | 4/2019 | Shabtay ........... H04N 5/232933 |

* cited by examiner

DUAL CAMERA REGIONS OF INTEREST DISPLAY

BACKGROUND

A region of interest in the context of image processing are those images or portions of images that are to be focused on. Such a focus on a specific portion of the image captured by a camera may be used in situations such as security monitoring, document optical character recognition, and medical imaging, among others.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Two dimensional (2D) images may be captured by a camera and a region of interest (ROI) within the field of view (FOV) may be identified. In the context of a video feed, the ROI may enclose an object that is to be tracked such as a document on a surface or an object within a FOV of a security camera, among others. Each time the object moves within the FOV, the ROI is to be updated so that the object remains in the ROI. During this process, however, the video stream produced by an image signal processor (ISP) of the camera breaks the streaming process or disengages a region of interest mode being executed on the camera. In the former example, a visible interruption in the stream may be seen by the user until the region of interest is updated. In this example, this interruption may be visually unappealing to a user and in the context of a high definition camera may occur repeatedly until the object is no longer trackable. In the latter example, the update of the ROI by exiting and reentering a ROI mode, the image may also be unappealing as the image may consistently switch from a larger FOV to a smaller FOV in order to update the ROI The present specification describes a method of determining a region of interest that includes, with a first image capturing device, determining a region of interest within a field of view common between the first image capturing device and a second image capturing device, the first image capturing device comprising a relatively lower resolution than the second image capturing device; determining a corner defining the region of interest; and upscaling the determined corner to match a corner within a field of view of an image captured by the second image capturing device. In any example presented herein, the corner defining the region of interest may be a set of corners defining that region of interest.

The present specification also describes an image capturing system that includes a first camera, that includes a region of interest module to: identify a region of interest; and determine a corner defining the region of interest; a second camera having a higher resolution than the first camera; an image upscaling module to match the corners within a field of view within an image captured by the second camera.

The present specification further describes a camera device, that includes a first image capturing device to capture a low-resolution image including a region of interest; a second image capturing device to capture a high-resolution image including the region of interest; a region of interest module to demarcate the corners bounding the region of interest; and an image signal processor to receive an upscaled image from the first image capturing device that includes the demarcated corners defining the region of interest in the high-resolution image.

As used in the present specification and in the appended claims, the term "region of interest (ROI)" is meant to be understood as any areas within a video frame or plurality of video frames (i.e., a video stream) that contain information of interest to a viewer. For example, within a surveillance setting wherein a surveillance camera generates a video stream, the region-of-interest may be the portion of the video stream capturing the activity or an object within the doorframe of the convenience store.

As used in the present specification and in the appended claims, the term "field of view (FOV)" is meant to be understood as an area in a scene that an image capturing device may capture.

Figure 1:
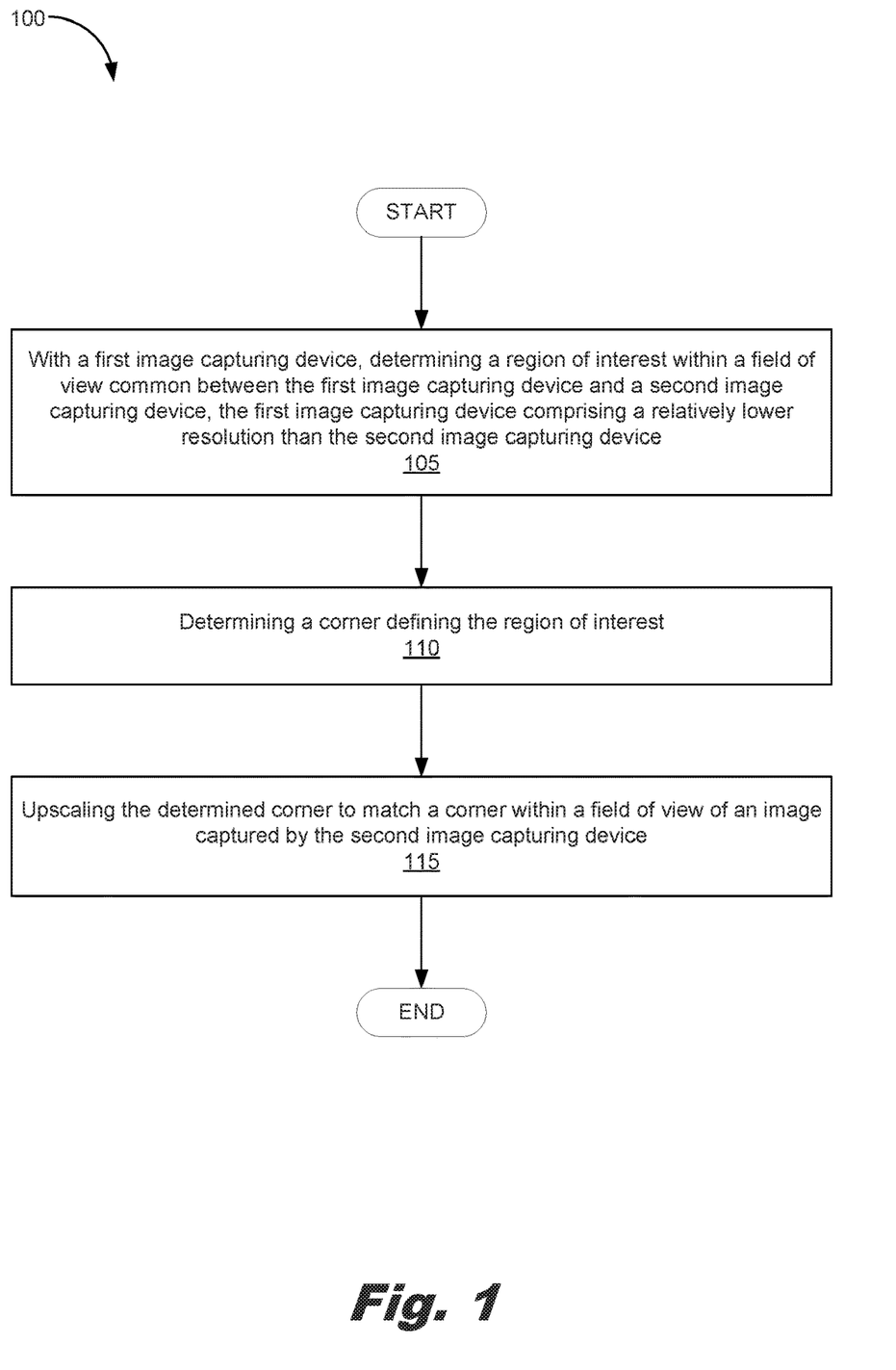
FIG. 1 is flowchart showing a method of determining a region of interest according to an example of the principles described herein.

Turning now to the figures, FIG. 1 is flowchart showing a method (100) of tracking an object according to an example of the principles described herein. The method (100) may include, with a first image capturing device, determining (105) a region of interest within a field of view common between the first image capturing device and a second image capturing device, the first image capturing device capturing an image at a lower resolution than the second image capturing device. In an example, the ROI may be determined (105) may be completed through the execution of an ROI identification module by a processor such as an image signal processor (ISP). Upon execution of the ROI identification module, each frame presented to the ISP may be evaluated and, using any object-based methods, feature-based methods, or any other methods, a region of interest may be defined. Whichever method is used, a specific object or region defining the ROI is created. In order to bound this region, a number of corners defining the ROI is determined (110). In an example, the corners form a quadrilateral shape around the ROI such that the entirety of the ROI fits within that quadrilateral shape. In the example where the ROI is a sheet of paper placed on a surface, the RI may be defined as the sheet of paper and the corners determined (110) in the method (100) may be the four corners of the sheet of paper. Other examples exist and the present specification contemplates the use of any bounding shape with any number of corners used to define the ROI. In an example, capturing an image of a document or sheet of paper may include keystone or perspective correction in order to correct a perspective of the ROI different from perpendicular. In any example presented herein, however, the ROI may have an aspect ratio equal to an aspect ratio of an output display device described herein.

As described herein, the ROI may be a common portion to the images captured by the first and second cameras. In an example, the first image capturing device may include a resolution lower than the resolution of the second image capturing device. In this example, the lower resolution of the first image capturing device may track the ROI within the ROI common to the image captured by the second imaging device. As the corners of the ROI are determined (110), the registered corners may be upscaled (115) within the relatively higher resolution second image capturing device in order to match the FOV of the relatively higher resolution of the second image capturing device. In an example, a region around an extreme corner of the ROI is upscaled (115) within the relatively higher resolution second image. Indeed, the smaller this region around the extreme corner of the ROI is, the quicker the upscaling (115) is completed by the processors described herein.

In an example, the FOV of the first image capturing device may include a FOV common with the second image capturing device. In any example presented herein, the FOV of the first image capturing device may be equal, less than, or greater than the second image capturing device. In any example, however, each of the FOV of the second image capturing device and first image capturing device may include the ROI.

In an example, the first and second image capturing devices may be part of a single data capturing device or camera device. In an example, the image captured by the first image capturing device may be an RGB image, an infrared image, a radar image, an ultraviolet image, or any other type of image on the electromagnetic spectrum. Indeed, either of the first and second image capturing devices may be image capturing devices that may capture any images within the electromagnetic spectrum. In an example, after upscaling (115) the determined (110) corners of the ROI, the relatively higher resolution video of the second image capturing device may be treated as a new ROI and the updated ROI is sent to an output device such as a television screen or other display device.

Thus, first image capturing device, having a relatively lower resolution than the second image capturing device, tracks the ROI and determines (110) any number of corners defining the ROI. A processor may then upscale (115) the corners in order to match the FOV of the relatively higher resolution second image capturing device. The upscaling process may take into consideration a difference between both image resolutions and aspect ratios of the images captured by the first image capturing device and second image capturing device. After completion of the upscaling (115) process, homography or other types of process may be implemented on those corners to register it to the any viewpoint of the second image capturing device. These upscaled (115), registered corners are sent to an ISP and any higher resolution frame received from the second image capturing device would be the new transformed ROI. From this ROI and estimated corner regions, fine-tuned corners are extracted through local feature refinement and transmitted to the ISP. This finely adjusts the ROI in the streaming video from the second image capturing device such that the next or subsequent frame has a ROI defined by those corners. In an example, the ROI adjustments happen at frame rate taking at the most 1-2 frames of the second image capturing device. As such, this increases the efficiency and image quality of the second image capturing device in order to present to a user a consistent and accurate high-resolution image of the ROI determined (105) by the first image capturing device. In these examples, because the relatively lower resolution frames from the first image capturing device are used to initially determine the corners defining the ROI, bandwidth overhead is reduced. Concurrently, however, ROI detection is relatively faster from a perspective of a host device associated with a display screen used to display the ROI. Any subsequent fine tuning of the higher resolution images may be accomplished by merely searching the corner neighborhood within the higher resolution images in order to find the meets and bounds of the corners. Any updates to the higher resolution streams are smooth. Additionally, because the corners are the sole portion of the images that are to be worked with for registration, this process of updating the ROI of the higher resolution frames is also very fast.

Figure 2:
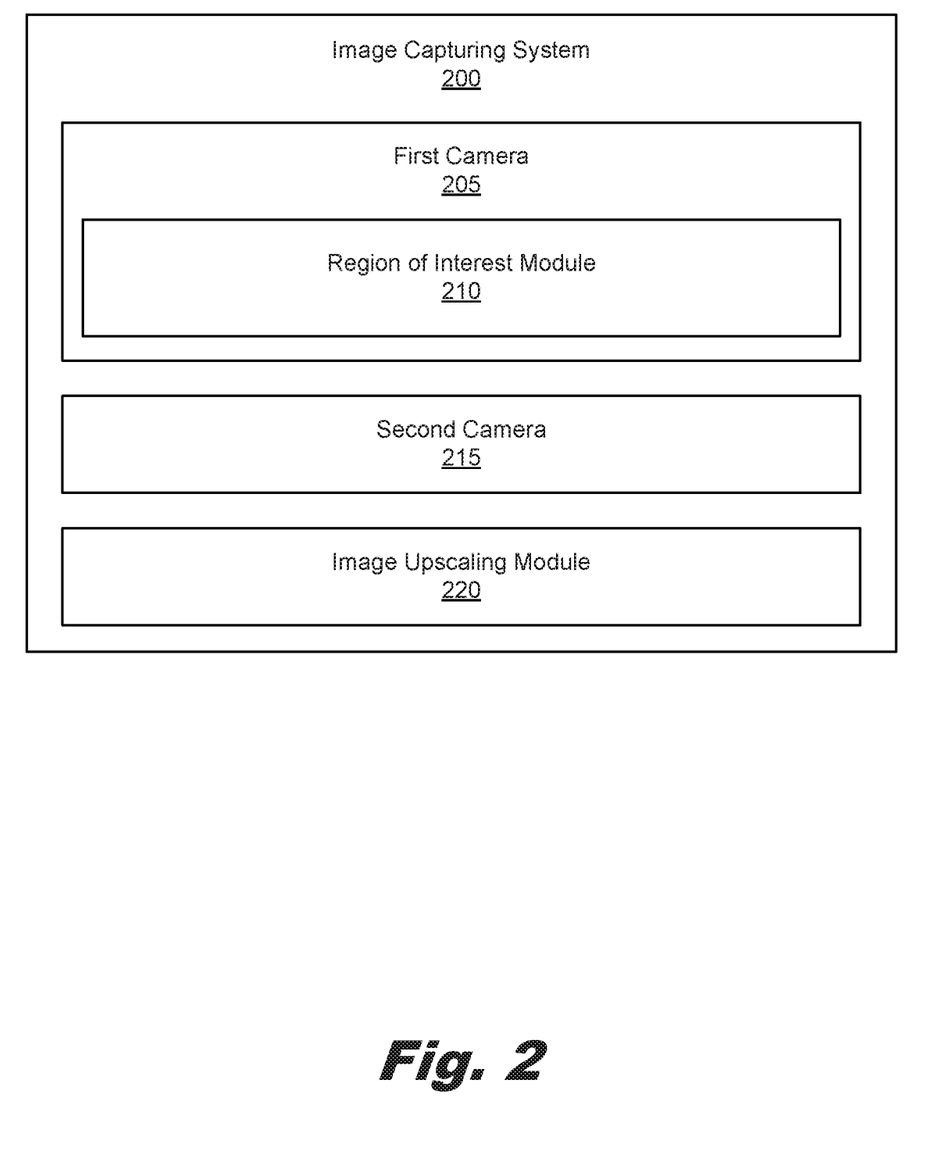
FIG. 2 is a block diagram of an image capturing system according to an example of the principles described herein.

FIG. 2 is a block diagram of an image capturing system (200) according to an example of the principles described herein. Image capturing system (200) may include a first camera (205) and second camera (215). As described herein, the first camera (205) may have a relatively lower resolution than that of the second camera (215). This allows an image signal processor of the image capturing system (200) to receive a detected region of interest from the first camera (205) and quickly process that relatively lower amounts of data associated with the lower resolution frames from the first camera (205). In this way, the first camera (205) may act as a tracking device for the second camera (215) in the described method.

The first camera (205) may include a region of interest module (210). The region of interest module (210) may be executed by an image signal processor (ISP) of the image capturing system (200) in order to initially identify a region of interest (ROI). The identification of any ROI within the lower resolution frames from the first camera (205) may be completed via execution of any computer readable program code that detects color changes, shapes, contours, other characteristics of an object or area within the images of the frames, or visual cues received from the first camera (205). In an example, the ROI is defined by an application being executed by the image capturing system (200). By way of example, where the application being executed is an optical character recognition application, the application may include computer executable program code to detect, for example, the shape, color, and/or texture of the sheet of paper and define the ROI as being bound by corners formed along corners of the image of the sheet of paper. In another example, the application being executed by the image capturing system (200) may include computer readable program code that detects objects within any frame recorded by the first camera (205). In this example, corners may also be defined that encompass the tracked object within the frames of the images recorded by the first camera (205). Consequently, the region of interest module (210) may also determine corners defining the ROI that is to be eventually displayed by a display device. These corners defined by the processing of the frames presented by the first camera (205) may be an initial regional estimation of the location of those corners.

As described herein, the field of view (FOV) of the first camera (205) may be equal to or larger than that of the second camera (215). In an example, the dimensions of the fields of view of the first camera (205) and second camera (215) may be different. In this example, however, the fields of view of the first camera (205) and second camera (215) overlap, at least, to encompass the entirety of the region of interest. In an example, the FOV of the first camera (205) may be moved relative to the second camera (215) with the overlapped portions of the FOV encompassing the ROI as described herein.

As described herein, the second camera (215) has a higher resolution than that of the first camera (205). During operation of the image capturing system (200) the corners of the ROI determined by the region of interest module (210) may be provided to an image upscaling module (220). The image upscaling module (220) may match the corners with corners within a field of view within an image captured by the second camera (215). In doing so, the image upscaling module (220) may upsample the corners to a higher resolution that, in an example, matches the resolution of the second camera (215). The scaling factor may be calculated by determining the ratio of a focal length of the second camera to a focal length of the first camera with each camera's focal length being determined from the calibration at the resolution for image capture. In an example, the scaling factor may be determined based on the following equation:

$$s = f_{second}/f\_first$$

where s is the upscaling factor, f_second is the focal length of the second camera, and f_first is the focal length of the first camera.

In this example, the upsampling may increase the sampling rate of the portions of the frames where the corners are located within the frames recorded by the first camera (205). In an example, the image upscaling module (220) may also register the determined corners to a perspective of the second camera (215). The upsampling process may be conducted within a single frame produced by the second camera (215).

During operation and once the corners are upscaled and matched to a frame produced by the second camera (215), the new region of interest within the FOV of the second camera (215) may be presented on a display device. The display device may form part of the image capturing system (200) and be communicatively coupled to the ISP of the image capturing system (200) so as to receive the image data therefrom.

Figure 3:
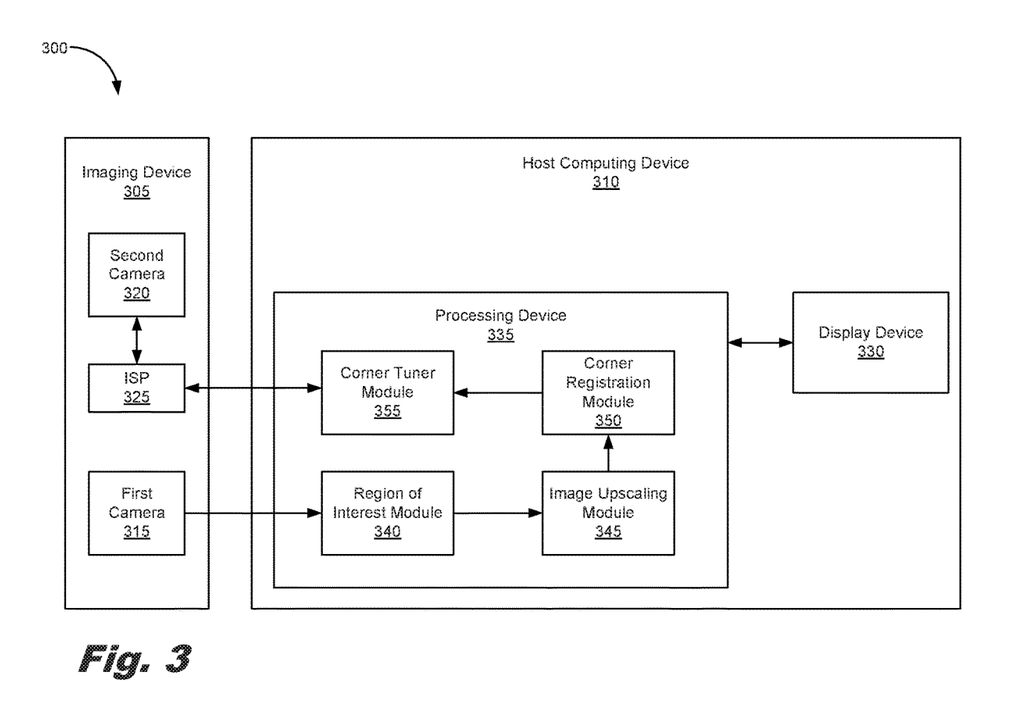
FIG. 3 is a block diagram of an image capturing system according to another example of the principles described herein.

FIG. 3 is a block diagram of an image capturing system (300) according to another example of the principles described herein. In this example, the image capturing system (300) may include an imaging device (305) and a host computing device (310). As described herein, the image capturing system (300) may include a first camera (315), a second camera (320), and, in this example, an image signal processor (325). The first camera (315) and second camera (320) may be arranged within the housing of the imaging device (305) in any configuration such that the first camera (315) and second camera (320) are directed towards a similar direction. However, as described herein, the first camera (315) and second camera (320) may have different fields of view (FOV) that overlap.

The imaging device (305) may also include an image signal processor (325). The image signal processor (325) may be any type of processing device that may receive the various image data from the first camera (315) and second cameras (320) and process that data according to the functionalities of the image capturing system (300) described herein. The image signal processor (325) may be capable of receiving data from the first camera (315) at a frame rate equal or relatively higher than the frame rate of the second camera (320).

During operation, both the first camera (315) and second camera (320) may record or otherwise capture any image or series of images (frames) and the image signal processor (325) may receive data descriptive of those images. The images captured by the first camera (315) may be sent to a region of interest module (340) being executed by a processing device (335) of the host computing device (310). Upon receipt of the image data from the image signal processor (325), the region of interest module (340) may determine a region of interests (ROI) as described herein. It may track this region of interest as it moves within the FOV of the first camera (315). Regions of interest may be dependent on the type of application being executed for which the image capturing system (300) is operating. For example, where the application being executed on the host computing device (310) is an optical character recognition application, the ROI may be determined to be a sheet of paper defined by certain optical characteristics that distinguish the sheet of paper from other surfaces such as the surface of a table or desk. at any given time as the region of interest module (340) determines the region of interest it may also define that region by denoting it with corners. The corners may define the meets and bounds of the region of interest.

As the corners are determined by the region of interest module (340), the image upscaling module (345) may adjust the resolution of the area around the corners so that the resolution at those corners is equal to the relatively higher resolution of the second camera (320). This adjustment may be made so as to register the corners to a region of interest of the second camera's (320) perspective using the corner registration module (350). That is to say, the corner registration module (350) determines whether or not the FOV of the first camera (315) and the second camera (320) are aligned so as to include the corners defined by the region of interest module (340). By doing so, the corner registration module (350) may define a number of coordinates within the images of the second camera (320) that define the new region of interest within the images of the second camera (320).

The image signal processor (325) may then receive these coordinates defining the corners within the images of the second camera (320). The image signal processor (325) then extracts the relevant ROI defined by the coordinates of the upscaled corners and send the data descriptive of that ROI to the display device (330). As described herein the aspect ratio of the ROI either selected by the first camera (315) or second camera (320) may match the aspect ratio of the display device (330). Because the frames used to track the ROI with the first camera (315) have a low resolution, the bandwidth overhead is reduced resulting in a quick response by the host computing device (310) in displaying a higher resolution image of the ROI to a user. Any fine tuning of the corners and ROI may be completed by updating, concurrently with displaying the image, the ROI and corner data to the image signal processor (325) so as to retrieve the correct higher resolution ROI from the second camera (215). This also results in the image signal processor (325) registering the corner data received and reducing the amount of processing tasks of the image signal processor (325) itself. Additionally, because of the initial object tracking, ROI detection, and corner data creation is completed by a processing device (335) on the host computing device (310), updating the ROI at the second camera (320) may be completed within one frame. This leads to increased ROI retrieval that is undetectable to a viewer of the display device (330). Even if the object being tracked moves out of the ROI of the second camera (320), the ROI is instantly updated because the tracking is completed by the first camera (315) and host computing device (310) so as to keep the object within the ROI of the second camera (320) continuously.

The modules (340, 345, 350, 355) may be directed by the processing device (310) of the host computing device (310). In an example, any of the modules (340, 345, 350, 355) may be an application specific integrated circuit (ASIC) that is electrically and communicatively coupled to the processing device (310) and operates to impart the functionalities as described herein. In an example, any of the modules (340, 345, 350, 355) may be in the form of a set of computer readable program code. Upon execution of the computer readable program code by the processing device (310), each of the modules (340, 345, 350, 355) may impart the functionalities as described herein. The various modules (340, 345, 350, 355) within the host computing device (310) may include executable program code that may be executed separately. In this example, the various modules (340, 345, 350, 355) may be stored as separate computer program products. In another example, the various modules within the host computing device (310) may be combined within a number of computer program products; each computer program product comprising a number of the modules.

The host computing device (310) may be any type of computing device. Examples of computing devices include servers, desktop computers, laptop computers, personal digital assistants (PDAs), mobile devices, smartphones, gaming systems, and tablets, among other electronic devices.

The host computing device (310) may be utilized in any data processing scenario including, stand-alone hardware, mobile applications, through a computing network, or combinations thereof. Further, the host computing device (310) may be used in a computing network, a public cloud network, a private cloud network, a hybrid cloud network, other forms of networks, or combinations thereof. In one example, the methods provided by the host computing device (310) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the host computing device (310) are executed by a local administrator.

To achieve its desired functionality, the host computing device (310) may include various hardware components. Among these hardware components may be the processing device (310), a number of data storage devices, a number of peripheral device adapters, and a number of network adapters. These hardware components may be interconnected through the use of a number of busses and/or network connections. In one example, the processing device (310), data storage device, peripheral device adapters, and network adapter may be communicatively coupled via a bus.

The processing device (310) may include the hardware architecture to retrieve executable code from the data storage device and execute the executable code. The executable code may, when executed by the processing device (310), cause the processing device (310) to implement at least the functionality of the processes and methods of the present specification described herein. In the course of executing code, the processing device (310) may receive input from and provide output to a number of the remaining hardware units.

The data storage device may store data such as executable program code that is executed by the processing device (310). The data storage device may specifically store computer code representing a number of applications that the processing device (310) executes to implement at least the functionality described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processing device (310) may boot from Read Only Memory (ROM), maintain nonvolatile storage in the Hard Disk Drive (HDD) memory, and execute program code stored in Random Access Memory (RAM). The data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the host computing device (310) may enable the processing device (310) to interface with various other hardware elements, external and internal to the host computing device (310) and specifically the imaging device (305). For example, the peripheral device adapters may provide an interface to input/output devices, such as, for example, the display device (330), a mouse, or a keyboard. The peripheral device adapters may also provide access to other external devices such as an external storage device, a number of network devices such as, for example, servers, switches, and routers, client devices, other types of computing devices, and combinations thereof.

The display device (330) may be provided to allow a user of the host computing device (310) not only to view the ROI but also to interact with and implement the functionality of the host computing device (310). The peripheral device adapters may also create an interface between the processing device (310) and the display device (330), a printer, or other media output devices. The network adapter may provide an interface to other computing devices within, for example, a network, thereby enabling the transmission of data between the host computing device (310) and other devices located within the network. The display device (330) may, when executed by the processing device (310), display a number of graphical user interfaces (GUIs) associated with the executable program code representing the number of applications stored on the data storage device. The GUIs may include aspects of the executable code as described herein allow a user to complete the processes and methods described herein. Examples of display devices (330) include a computer screen, a laptop screen, a mobile device screen, a personal digital assistant (PDA) screen, and a tablet screen, among other display devices (330).

Figure 4:
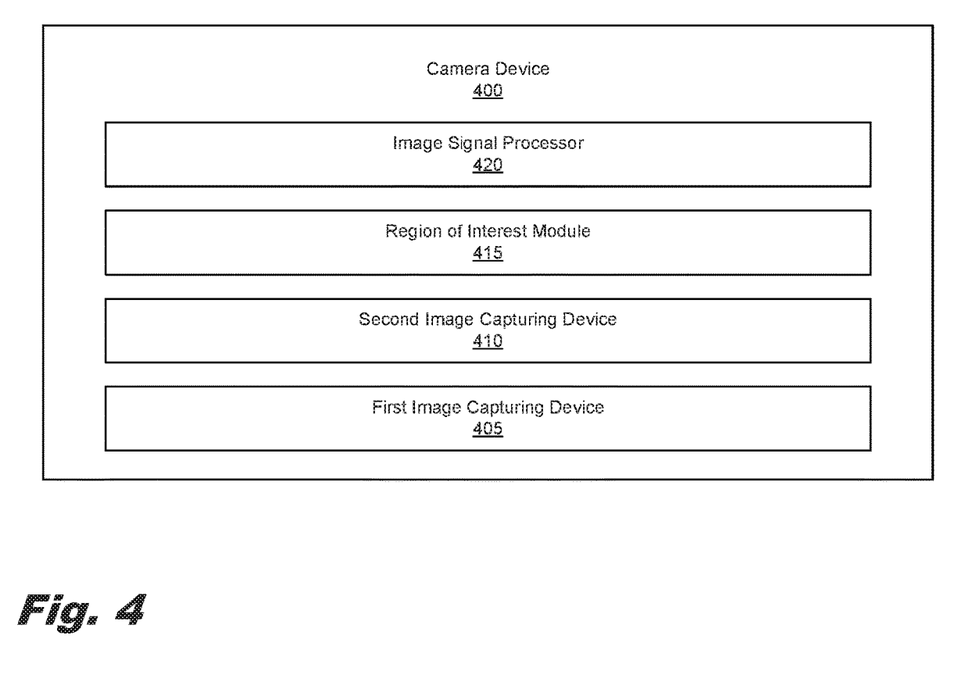
FIG. 4 is a block diagram of a camera device according to an example of the principles described herein.

FIG. 4 is a block diagram of a camera device (400) according to an example of the principles described herein. In this example, the camera device (400) includes a first image capturing device (405) and a second image capturing device (410) that operate under the control of an image signal processor (420). However, in this example, the camera device (400) includes a region of interest module (415). As described herein, the region of interest module (415) may receive, at least initially, images captured by the first image capturing device (405). The region of interest module (415) may then determine a region of interest (ROI) and determine corners of that ROI as described herein. It may track this region of interest as it moves within the FOV of the first image capturing device (405). In this example, therefore, the image signal processor (420) may take on the processing responsibilities of also executing the region of interest module (415) as described herein. This may reduce the drain of processing power of, for example, a host computing device (FIG. 3, 310) or eliminate it altogether if and when the host computing device (FIG. 3, 310) does not include its own processing device.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processing device of the host computing device or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of determining a region of interest, comprising:
   with a first image capturing device, determining a region of interest within a field of view of the first image capturing device and a second image capturing device, the first image capturing device capturing an image at a lower resolution than the second image capturing device, the field of view being the same in the first image capturing device and the second image capturing device;
   determining a corner defining the region of interest; and
   upscaling a resolution of the determined corner to match a resolution of a corner within a field of view of an image captured by the second image capturing device which has a higher resolution than the first image capturing device.

2. The method of claim 1, comprising completing the upscaling of the corner within a single frame.

3. The method of claim 1, wherein the first image capturing device and second image capturing device are within the same device.

4. The method of claim 1, wherein the first image capturing device and second image capturing device have different fields of view.

5. The method of claim 1, wherein the first image capturing device is an image capturing device that captures an image within the electromagnetic spectrum.

6. The method of claim 1, wherein a frame rate of the first image capturing device is equal to or higher than a frame rate of the second image capturing device.

7. The method of claim 1, wherein the first image capturing device sends image data captured to a host device for corner determination and corner upscaling.

8. The method of claim 1, further comprising performing a keystone correction to register the determined corners to a perspective of the second image capturing device.

9. The method of claim 1, wherein determining a region of interest comprises performing pixel analysis to identify an object to be tracked within the region of interest.

10. The method of claim 1, wherein determining a region of interest comprises performing object recognition to identify an object to be tracked within the region of interest.

11. The method of claim 1, wherein upscaling the determined corner comprises increasing a sampling rate of portions of frames where the determined corners are located within frames recorded by the first image capturing device.

12. The method of claim 1, further comprising upscaling just the determined corner to match the corner within the field of view of the image captured by the second image capturing device.

13. An image capturing system, comprising:
   a first camera, comprising:
      a region of interest module to:
         identify a region of interest, wherein the region of interest comprises an object within a field of view that is to be tracked; and
         determine a corner defining the region of interest;
   a second camera having a higher resolution than the first camera; and
   an image upscaling module to upscale a resolution of a determined corner to match a resolution of the corners within a field of view within an image captured by the second camera while other portions of the region of interest are not upscaled.

14. The image capturing system of claim 13, wherein the image upscaling module receives upscaling data from a processor of a host device communicatively coupled to the image capturing system.

15. The image capturing system of claim 13, wherein the first camera records an infrared image.

16. The image capturing system of claim 14, wherein the host device streams a video image of the matched corners within the field of view of the captured images received by the second camera.

17. The image capturing system of claim 13, wherein a frame rate of the first camera is equal to or higher than a frame rate of the second camera.

18. A camera device, comprising:
a first image capturing device to:
 capture a low-resolution image including a region of interest, wherein the region of interest comprises an object within a field of view that is to be tracked;
 track the object with low-resolution image data; and
 update the region of interest as the object moves;
a second image capturing device to capture a high-resolution image including the region of interest;
a region of interest module to demarcate the corners bounding the region of interest; and
an image signal processor to:
 upscale a resolution of the demarcated corners to match a resolution of a corner within a field of view of an image captured by the second image capturing device which has a higher resolution than the first image capturing device;
 receive an upscaled image from the first image capturing device that includes the demarcated corners defining the region of interest in the high-resolution image;
 identify coordinates defining the demarcated corners within the high-resolution image of the second image capturing device; identify a region of interest within the field of view of the second image capturing device based on an identification of coordinates of the demarcated corners.

19. The camera device of claim 18, wherein a frame rate of the first image capturing device is equal to or higher than a frame rate of the second image capturing device.

20. The camera device of claim 18, wherein the first image capturing device is an infrared camera.

* * * * *